United States Patent
Tong et al.

(10) Patent No.: US 11,042,986 B2
(45) Date of Patent: Jun. 22, 2021

(54) METHOD FOR THINNING AND CONNECTION IN LINEAR OBJECT EXTRACTION FROM AN IMAGE

(71) Applicant: University of Electronic Science and Technology of China, Chengdu (CN)

(72) Inventors: Ling Tong, Chengdu (CN); Fanghong Xiao, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 61 days.

(21) Appl. No.: 16/699,119

(22) Filed: Nov. 29, 2019

(65) Prior Publication Data

US 2020/0327673 A1    Oct. 15, 2020

(51) Int. Cl.
*G06T 7/11* (2017.01)
*G06T 7/136* (2017.01)
*G06T 7/12* (2017.01)
*G06T 7/194* (2017.01)
*G06K 9/36* (2006.01)

(52) U.S. Cl.
CPC ............... *G06T 7/11* (2017.01); *G06K 9/36* (2013.01); *G06T 7/12* (2017.01); *G06T 7/136* (2017.01); *G06T 7/194* (2017.01); *G06T 2207/20012* (2013.01); *G06T 2207/20021* (2013.01)

(58) Field of Classification Search
CPC ........ G06K 9/6271; G06K 9/627; G06K 9/36; G06T 7/11; G06T 7/12; G06T 7/194; G06T 7/136
See application file for complete search history.

(56) References Cited

U.S. PATENT DOCUMENTS

| | | | |
|---|---|---|---|
| 2005/0031119 A1* | 2/2005 | Ding | H04L 9/0833 380/28 |
| 2014/0201126 A1* | 7/2014 | Zadeh | A61B 5/165 706/52 |
| 2017/0109881 A1* | 4/2017 | Avendi | G06T 7/149 |
| 2018/0204111 A1* | 7/2018 | Zadeh | G06K 9/3233 |

* cited by examiner

*Primary Examiner* — Jingge Wu

(57) ABSTRACT

A method for thinning and connection in linear object extraction from an image and including the following steps: 1. extracting direction features using various sliding windows from the binary image obtained of linear objects. 2. decomposing the binary image into several binary image layers according to the direction features. 3. extracting thinned curves and endpoints of each binary image layer by conducting curve fitting on each connected component using coordinate information. 4. connecting the thinned curves by computing spatial distances between the endpoints belonging to different thinned curves, angles between the tangential direction and connected direction vectors of the connected points. Finally, the road network image is constructed by overlaying image layers with the thinned curves.

6 Claims, 9 Drawing Sheets

METHOD FOR THINNING AND CONNECTION IN LINEAR OBJECT EXTRACTION FROM AN IMAGE

CROSS REFERENCE TO RELATED APPLICATION

BACKGROUND

The present invention relates to the field of image processing. More particularly, it relates to a method for optimization of identifying and extracting linear objects from an image.

The rapid development of imaging technology makes a lot of image data available which may be obtained from synthetic aperture radar (SAR), optical cameras, magnetic resonance imaging (MRI), and so on. Depending on the shape of the objects, the objects in the image can be roughly divided into point targets, linear targets and area targets. In terms of linear objects, it could be boundaries of different types of regions or objects themselves, such as the road and river. Linear target extraction is one of the important parts of image interpretation and has broad application prospects. For instance, automatic road extraction from the remote sensing image can be used for updating of geographic information system (GIS), which is more effective compared with traditional field survey on the spot or human visual inspection of the optical image. However, due to the existence of noise and the variable complex situations around the linear targets, the extraction results of linear objects of interest may be irregular or incomplete. Thus, there exists a need for an optimization to achieve an improved extraction results of linear objects.

SUMMARY

Techniques for processing images are provided in the present invention. More specifically, the present invention provides a thinning and connection method for the extraction results of linear objects from an image. The purpose of the present invention is to achieve a refined and regular line detection result.

According to the present invention, a method for thinning and connection in linear object extraction from an image is provided. First, the method includes extracting the direction features of linear objects by utilizing a group of sliding windows with different orientations in a binary image. The binary image contains the candidates of linear objects which are obtained by segmentation approaches from original images. Second, the binary image is decomposed into several binary image layers according to the direction features grouping. The pixels of linear objects in the same binary image layer have similar direction features. The third step is extracting thinned curves and endpoints from each binary image layer by conducting curve fitting on each connected component using coordinate information. The fourth step consists of connecting the gaps according to the Euclidean distance between two endpoints and the corresponding included angles between the tangential direction vector and the connected direction vector at the endpoints. Finally, the extraction result is obtained by overlaying all the thinning curves and connected gaps in each image layer.

According to specific embodiments, there can be many benefits and/or advantages. The present disclosure extracts the thinned curves using curves fitting according to the direction feature grouping. Therefore, each detected line segment has a corresponding mathematical expression, which is one of the benefits of the present disclosure. The endpoints and the tangential direction vector can be easily determined with the help of the mathematical expression, which can serve the following process of gap connection. The present disclosure can improve the extraction results in terms of both smoothness and completeness. For example, embodiments of the present disclosure provide a method that can achieve smoother thinning results compared with traditional morphology thinning method which may generate small burrs or rough edges. Depending upon the embodiments, one or more of these advantages may be achieved.

DETAILED DESCRIPTION OF SPECIFIC EMBODIMENTS

In the following, a specific embodiment of the present invention will be described in detail with reference to the accompanying drawings such that those skilled in the art can better understand the invention. In the embodiment, the road is considered as the linear object of interest and is extracted from the original optical image. It is noted that well-known functions and configurations are not described in detailed to avoid obscuring the present invention.

Figure 1:
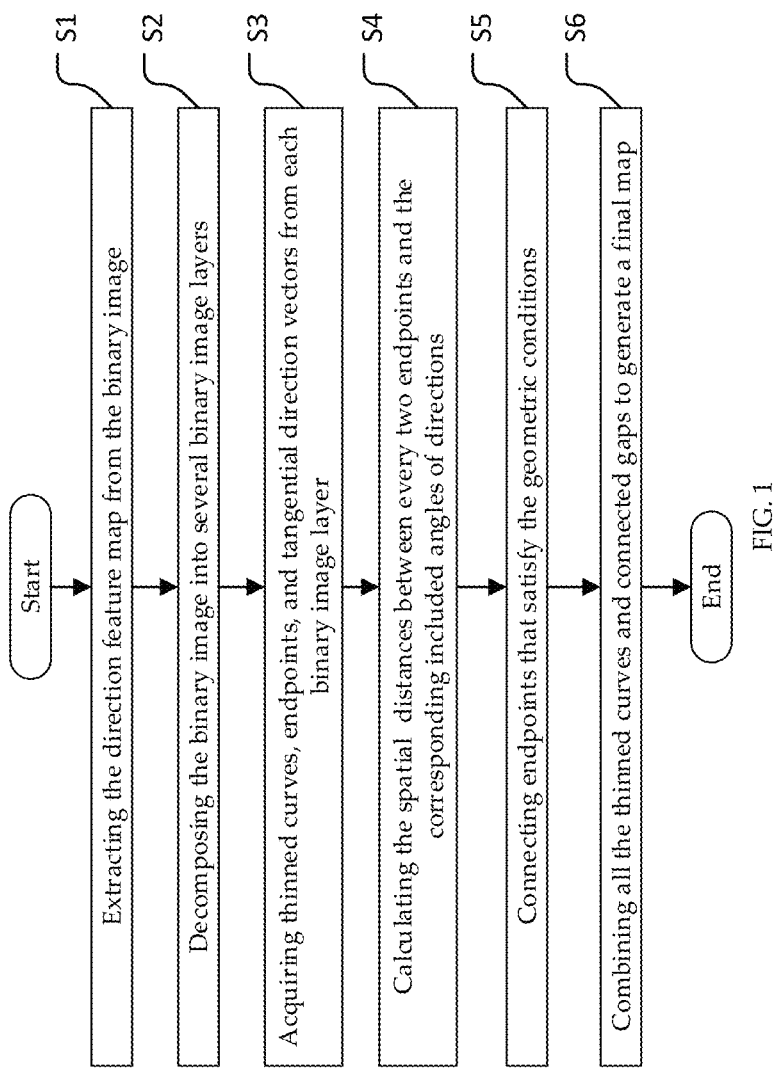
FIG. 1 illustrates a flow chart of the method for thinning and connection in linear object extraction from an image according to an embodiment of the present disclosure.

According to the present invention, a method for thinning and connection in linear object extraction from an image is provided. FIG. 1 illustrates a flow chart of the method for thinning and gap connection in linear object extraction from an image. As shown in FIG. 1, the method provided by the present invention comprises the steps of:

S1. Extracting the direction feature map from the binary image.

Figure 2:
FIG. 2 is an example of an original optical image to be processed.
Figure 3:
FIG. 3 is the binary image of road candidates achieved from FIG. 2 using a machine learning method.

As an example, the original image to be processed is a high resolution optical remote sensing image which is shown in FIG. 2. The road is the focused linear object in this embodiment and is segmented with a deep learning approach. A segmented binary image of the road is shown in FIG. 3.

Figure 4:
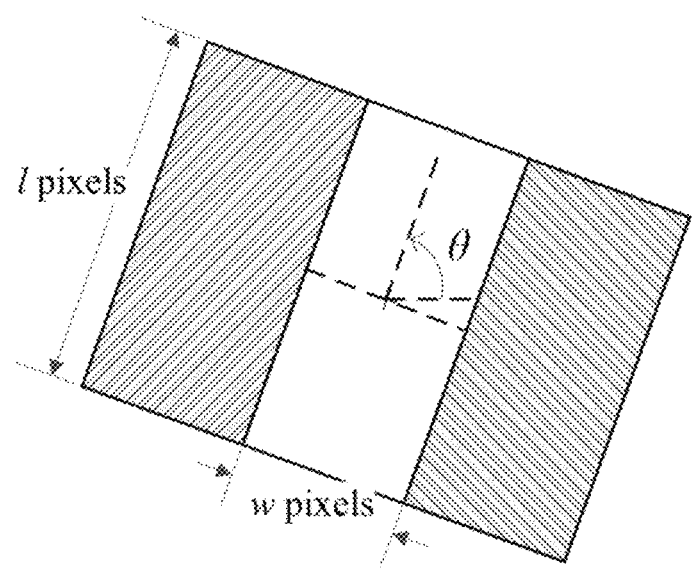
FIG. 4 is a sketch map illustrating the sliding window detecting the direction feature.
Figure 5:
FIG. 5 is the direction feature map generated from FIG. 3 according to an embodiment of the present disclosure.

In this embodiment, response values at each pixel are computed using a group of sliding windows with different direction features. As shown in FIG. 4, the sliding window $W(\theta, w, l)$ is specified by the rotation angle $\theta$, width $w$, and length $l$. With the sliding window, multiplicative Duda operation is applied to compute the response value at each pixel. The details of the method for computing the response value using the specified window can be found in G. Geling & D. Ionescu's "An edge detection operator for SAR images", Canadian Conference on Electrical and Computer Engineering, 1993. Then, the corresponding window rotation angle which has the maximum response value is selected as the direction feature. That is, the direction feature for each pixel j is $$t_j = \underset{\theta}{\mathrm{argmax}}\{\{f(j \mid W(\theta, w, l))\}\}$$

where f (j|W (θ, w, l)) represents the response value at the pixel j using the specified window W(θ, w, l). In this embodiment, and without any loss of generality, the value of the parameter θ belongs to the direction set G={0, π/8, π/4,3π/8,π/2,5π/8,3π/4,7π/8}, the value of the parameter w is belongs to the set {15,23,31} and the value of the parameter 1 is set to 101 pixels. With these parameter settings, the direction feature map generated from FIG. 3 according to the present disclosure is shown in FIG. 5 where the different levels of gray represent the different direction features. Note, and without any loss of generality, alternative values for the sets associated with θ and w and the parameters l can be chosen.

S2. Decomposing the binary image into several binary image layers according to the direction feature map.

Figure 6:
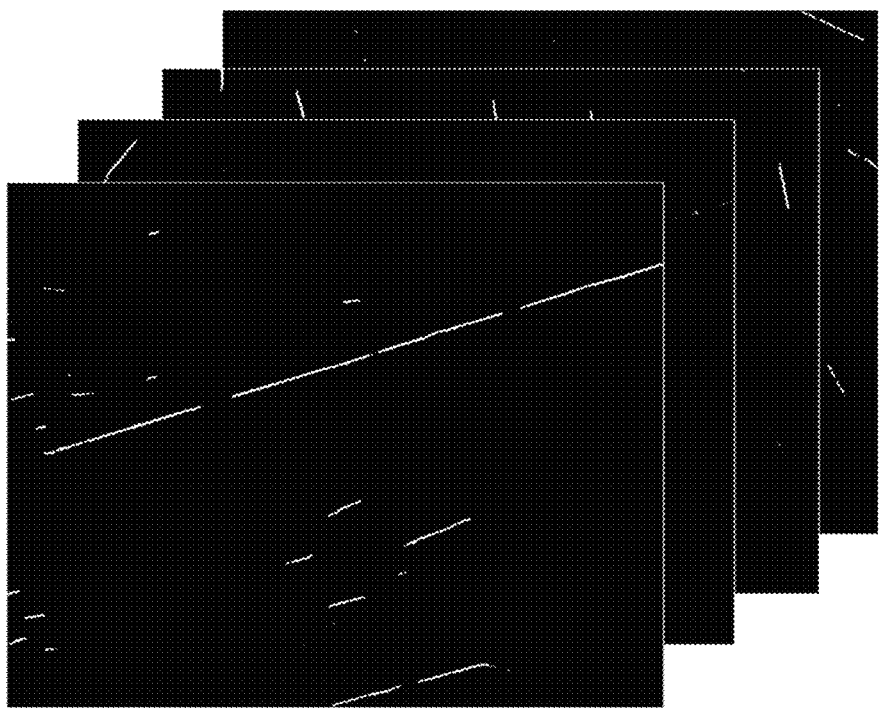
FIG. 6 illustrates several image layers achieved from FIG. 3 by direction feature grouping.

A grouping process is conducted on the direction set G according to the proximity of directions. The binary image is then decomposed into several binary image layers according to the group to which the pixel direction feature belongs. In other words, all the linear object pixels on an image layer have similar directional characteristics. In the embodiment of the present disclosure, and without any loss of generalization, the direction set G is divided into 4 groups which are G1={0, π/8}, G2={π/4, 3π/8}, G3={π/2, 5π/8}, and G4={3π/4, 7π/8} respectively. FIG. 6 illustrates the binary image layers achieved from FIG. 3 by decomposition with direction feature grouping.

S3. For a binary image layer, acquiring a new layer which contains the thinned curves of the linear object using the method of curves fitting and extracting all the endpoints of curves and their corresponding tangential direction vectors.

More specially, the step of S3 involves the steps of:

S3.1: For a binary image layer, apply the method of connected-component (CC) labeling to obtain a labeled CC map.

S3.2: Compute the pixel area of each CC and remove CCs in which the pixel area is smaller than $T_{area}$;

S3.3: Create a rectangular coordinate system, achieve the fitted curve for each CC based on the approach of polynomial curves fitting which uses the pixel coordinates as data points, and record the two endpoints of each fitted curve and their corresponding tangential direction vectors.

Figure 7:
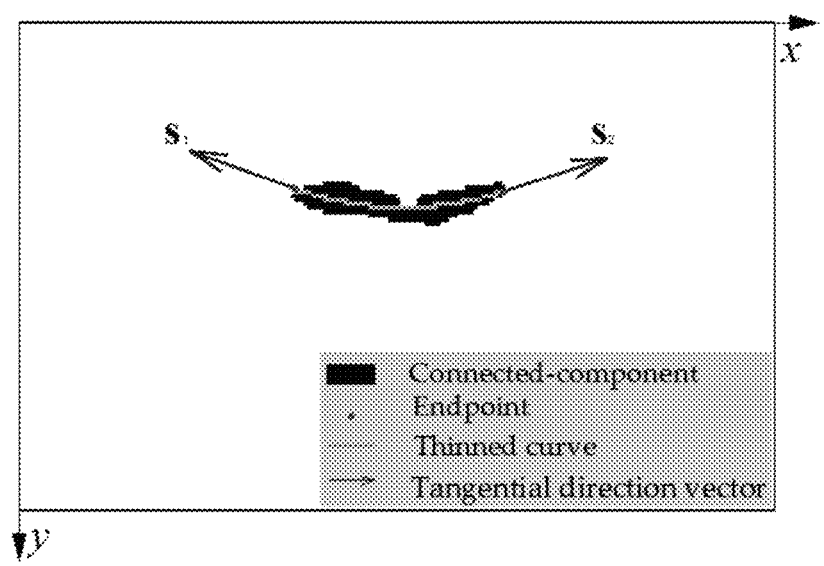
FIG. 7 is a sketch map illustrating the polynomial curves fitting, endpoints and tangential direction vector extraction for a connected component.

FIG. 7 gives an example of the thinned curve obtained from a CC using the method of polynomial curves fitting, together with the corresponding derived endpoints and tangential direction vectors s.

S4. For each binary image layer, calculating the spatial Euclidean distances between every two endpoints and the corresponding two included angles between tangential direction vectors and connected direction vectors.

Figure 8:
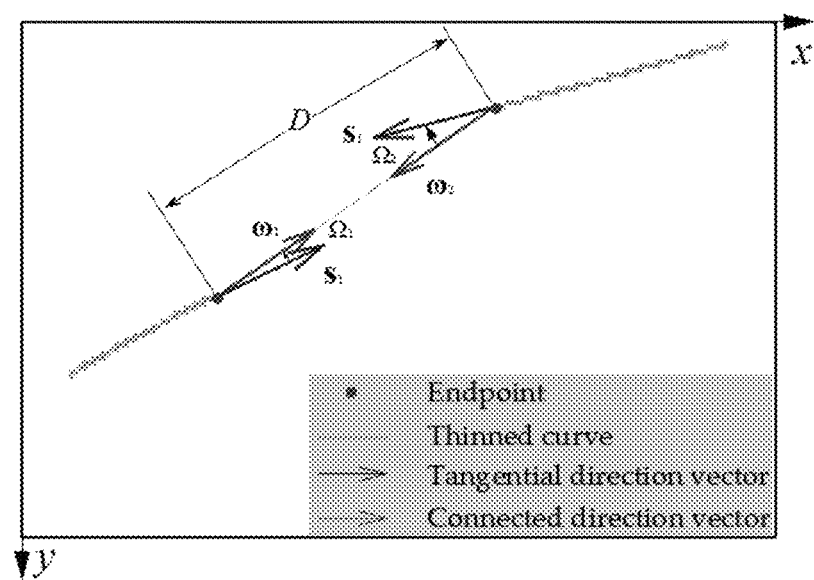
FIG. 8 is a sketch map illustrating the spatial distance and related angle between endpoints for the process of gap connection.

As shown in FIG. 8, the connected direction vector ω is defined as a vector that one endpoint points to another endpoint. Meanwhile, the definitions of spatial Euclidean distance D and included angle Ω are also illustrated in FIG. 8.

S5. Connecting gaps that satisfy the geometric conditions.

According to the spatial Euclidean distance and included angles, the two endpoints are connected with the straight line if they do not belong to the same CC and one of the geometric constraint conditions below is satisfied.

$$D \le T_{D1} \qquad 1)$$

$$T_{D1} < D \le T_{D2}, \Omega_1 \le T_\Omega, \text{ and } \Omega_2 \le T_\Omega \qquad 2)$$

The symbols $T_{D1}$, $T_{D2}$ are two Euclidean distance thresholds and the symbol $T_\Omega$ represents the included angle threshold.

S6. Conducting the steps S4, S5, and S6 for all the binary image layers and combining all the thinned curves and connected gaps to generate a final map of linear object extraction.

Figure 9:
FIG. 9 is the final road extraction map which combines all the thinning curves and connected gaps in each image layer.

The process of combination is a logical OR operation which means one pixel will be labeled as the linear object if it belongs to the linear object in any of the image layers. In this embodiment, the final map using the thinning and gap connection method in the present disclosure is shown in FIG. 9. To achieve the result in FIG. 9, the pixel area threshold $T_{area}$ is set to 30 pixels, the distance threshold $T_{D1}$ is equal to 50 and $T_{D2}$ is 300, and the included angle threshold $T_\Omega$ is set to π/8.

In the embodiment, the extracted linear objects are the road, though other linear objects may be extracted from the image according to the characteristics thereof.

The above is only the preferred embodiment of the disclosure and is not intended to limit the disclosure. For a person skilled in the art, the disclosure may have a variety of changes and modifications. Any change, equivalent replacement, or improvement made within the spirit and principle of the present disclosure should be included in the protection scope of the disclosure.

General

Unless specifically stated otherwise, as apparent from the following discussions, it is appreciated that throughout the specification discussions utilizing terms such as "processing," "computing," "calculating," "determining" or the like, refer to the action and/or processes of a host device or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory.

The methodologies described herein are, in one embodiment, performable by one or more processors that accept machine-readable instructions, e.g., as firmware or as software, that when executed by one or more of the processors carry out at least one of the methods described herein. In such embodiments, any processor capable of executing a set of instructions (sequential or otherwise) that specify actions to be taken may be included. Thus, one example is a programmable DSP device. Another is the CPU of a microprocessor or other computer-device, or the processing part of a larger ASIC. A processing system may include a memory subsystem including main RAM and/or a static RAM, and/or ROM. A bus subsystem may be included for communicating between the components. The processing system further may be a distributed processing system with processors coupled wirelessly or otherwise, e.g., by a network. If the processing system requires a display, such a display may be included. The processing system in some configurations may include a sound input device, a sound output device, and a network interface device. The memory subsystem thus includes a machine-readable non-transitory medium that is coded with, i.e., has stored therein a set of instructions to cause performing, when executed by one or more processors, one of more of the methods described herein. Note that when the method includes several elements, e.g., several steps, no ordering of such elements is implied, unless specifically stated. The instructions may reside in the hard disk, or may also reside, completely or at least partially, within the RAM and/or other elements within the processor during execution thereof by the system. Thus, the memory and the processor also constitute the non-transitory machine-readable medium with the instructions.

Furthermore, a non-transitory machine-readable medium may form a software product. For example, it may be that the instructions to carry out some of the methods, and thus form all or some elements of the inventive system or apparatus, may be stored as firmware. A software product may be available that contains the firmware, and that may be used to "flash" the firmware.

Note that while some diagram(s) only show(s) a single processor and a single memory that stores the machine-readable instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a non-transitory machine-readable medium coded with, i.e., having stored therein a set of instructions for execution on one or more processors, e.g., one or more processors that are part of the receiver forming a pen stroke capture system.

Note that, as is understood in the art, a machine with application-specific firmware for carrying out one or more aspects of the invention becomes a special purpose machine that is modified by the firmware to carry out one or more aspects of the invention. This is different than a general-purpose processing system using software, as the machine is especially configured to carry out the one or more aspects. Furthermore, as would be known to one skilled in the art, if the number the units to be produced justifies the cost, any set of instructions in combination with elements such as the processor may be readily converted into a special purpose ASIC or custom integrated circuit. Methodologies and software have existed for years that accept the set of instructions and particulars of, for example, the processing engine 131, and automatically or mostly automatically great a design of special-purpose hardware, e.g., generate instructions to modify a gate array or similar programmable logic, or that generate an integrated circuit to carry out the functionality previously carried out by the set of instructions. Thus, as will be appreciated by those skilled in the art, embodiments of the present invention may be embodied as a method, an apparatus such as a special purpose apparatus, an apparatus such as a data DSP device plus firmware, or a non-transitory machine-readable medium. The machine-readable carrier medium carries host device readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form a computer program product on a non-transitory machine-readable storage medium encoded with machine-executable instructions.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a host device system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference, except in those jurisdictions where incorporation by reference is not permitted. In such jurisdictions, the Applicant reserves the right to insert portions of any such cited publications, patents, or patent applications if Applicant considers this advantageous in explaining and/or understanding the disclosure, without such insertion considered new matter.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

The term "image" typically represents a digital representation of an image. It may represent a digital grey scale or color image with multiple channels, including meta channels such as depth and transparency.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Note that the claims attached to this description form part of the description, so are incorporated by reference into the description, each claim forming a different set of one or more embodiments.

What is claimed is:

1. A method for thinning and connection in linear object extraction from an image, the method comprising:
   deriving the binary image of linear objects from the original image by the linear object detection methods;
   extracting the direction feature map from the binary image;
   decomposing the binary image into several binary image layers that there is the same direction feature in an image layer;
   for each binary image layer, obtaining a new layer which contains the thinned curves of the linear object using the method of curve fitting and extracting the tangential direction vectors at the endpoints of curves;
   for each binary image layer, calculating the spatial Euclidean distances between every two endpoints and the two angles between tangential direction and connected direction vectors;
   for each binary image layer, connecting the endpoints which belong to the different connected-components and satisfy the geometric conditions; and
   overlaying all the image layers which contain the extracted and connected thinned curves to generate a final map of linear object extraction.

2. The method of claim 1 wherein the direction feature map is obtained by using multiplicative Duda operation to compute the response values with specified sliding windows at each pixel and selecting the direction of the window which has the maximum response value.

3. The method of claim 1 wherein the process of decomposition comprising:
   dividing the direction features into several groups according to the proximity of the direction; and
   decomposing the binary image into several layers in which the pixels have similar directional characteristics.

4. The method of claim 1 wherein the process of obtaining a new layer comprising:
   applying the method of connected-component (CC) labeling on the binary image layer to obtain a labeled CC map;
   computing the pixel area of each CC and remove CC in which the pixel area is smaller than the selected threshold; and
   creating a rectangular coordinate system, achieving the fitted curve for each CC based on the approach of polynomial curves fitting which uses the pixel coordinates as data points, and recording the two endpoints and their tangential direction vectors using the fitting curve functions.

5. The method of claim 1 wherein the geometric conditions comprising:

$$D \leq T_{D1} \qquad \qquad 1); \text{ or}$$

$$T_{D1} < D \leq T_{D2}, \Omega_1 \leq T_\Omega, \text{ and } \Omega_2 \leq T_\Omega \qquad \qquad 2)$$

where D is the spatial Euclidean distance between two endpoints, $\Omega_1$, $\Omega_2$ are the two angles between tangential direction and connected direction vectors, and $T_{D1}$, $T_{D2}$, $T_\Omega$ denote three thresholds.

6. The method of claim 1 wherein the overlaying is the logical OR applied for all corresponding pixels on the thinned curve layers, reconstructing the final road network image.

* * * * *